United States Patent [19]

Lang et al.

[11] 4,341,435
[45] Jul. 27, 1982

[54] STEREOSCOPIC MICROSCOPE FOR MULTIPLE OBSERVATION

[75] Inventors: Walter Lang, Königsbronn; Ortwin Müller, Aalen; Alfons Neidlinger, Heidenheim, all of Fed. Rep. of Germany

[73] Assignee: Carl Zeiss-Stiftung, Fed. Rep. of Germany

[21] Appl. No.: 211,129

[22] Filed: Nov. 28, 1980

[30] Foreign Application Priority Data

Dec. 8, 1979 [DE] Fed. Rep. of Germany ....... 2949428

[51] Int. Cl.³ .............................................. G02B 21/22
[52] U.S. Cl. ......................................... 350/35; 350/91
[58] Field of Search ........................ 350/35, 33, 31, 34, 350/43, 44, 85, 91, 49, 173, 171, 170, 172, 19

[56] References Cited

U.S. PATENT DOCUMENTS 4,138,191  2/1979  Peyman et al. .................. 350/19
4,232,933  11/1980  Nakahashi ........................ 350/44
4,277,130  7/1981  Takahashi ........................ 350/44

Primary Examiner—Jon W. Henry
Attorney, Agent, or Firm—Stonebraker, Shepard & Stephens

[57] ABSTRACT

A stereoscopic microscope arranged for multiple observation, so that a surgical operation or other event may be observed simultaneously by two observers, or by one observer and a television apparatus. Three observation light paths are provided, with the centers of their respective entrance pupils lying at the three corners of a triangle. By splitting one beam, two pairs of stereoscopically related observation paths can be obtained. The pupil of the split light path has a diameter which is larger than the diameter of the pupil the other two light paths by a factor approximately equal to square root of two, so that both observers will see images of approximately equal brightness with their right and left eyes. Various specific arrangements of the observation light paths are disclosed.

8 Claims, 6 Drawing Figures

_4,341,435_

STEREOSCOPIC MICROSCOPE FOR MULTIPLE OBSERVATION

BACKGROUND OF THE INVENTION

One of the most important applications for stereoscopic microscopes is as operating microscopes in microsurgery. When using the operating microscope for this purpose, the type of illumination and the possibility of simultaneous observation, i.e. the simultaneous use of the operating microscope by two observers or use by one observer and simultaneous observation on a television screen, are important factors. As surgical procedures become more and more complicated, the surgeon must increasingly rely on an assistant for certain steps in the procedure and for general cooperation. With respect to instruments, it is mandatory that the assistant has the same or almost the same opportunities for working and observing as the principal surgeon.

It is known to provide an operating microscope with two complete stereoscopic optical paths at 90° in such a manner that they share a common housing and a common magnifying objective. See, for example, U.S. Pat. No. 4,138,191, granted Feb. 6, 1979, to Peyman et al. One disadvantage of this solution is that the instrument becomes very cumbersome, which prevents compact design with enclosed illumination and makes it difficult to provide zoom lens systems for all four light paths.

SUMMARY OF THE INVENTION

The purpose of the invention is therefore to create a microscope for multiple observation which requires only simple design elements and which can be built in a compact design with enclosed illumination. In addition, it permits two observers to observe the area of the surgery under the same stereoscopic angle in view.

According to the invention, this purpose is achieved by providing three observing light paths, means causing said light paths to converge in the direction toward the object, the centers of the entrance pupils of said observing light paths lying at the corners of a triangle. Means for physical beam splitting are provided in at least one of said observing light paths which permit simultaneous use of this path by two observers. The convergence of the observing light paths toward the object may be produced in a manner known per se, by having three objectives arranged in the manner of a Greenough microscope, which are inclined toward each other by the angle of convergence, or alternatively a common objective may be provided for the three observing light paths in which the convergence of the observing light paths is generated by prismatic effects at this common objective.

In order to compensate for the attenuation of light caused by the physical beam splitting in the observing light path common to both observers, it is advantageous that the entrance pupil of this path has a diameter which is greater by a factor of 1.4142 (the square root of 2) than that of the other two entrance pupils. Such compensation ensures that each observer sees an equally bright image with his right and left eye.

In an advantageous embodiment of the invention, the centers of the entrance pupil of the observing light paths are located at the corners of an isosceles rectangular triangle, with the entrance pupil common to both observers being located at the right angle of the triangle. In such an arrangement the stereoptic base of one observer has the same size as that of the other and forms a right angle with it.

If the centers of the entrance pupils of the three observing light paths are located at the corners of an equilateral triangle and physical beam splitting is provided for all light paths, it is for the first time possible to build a genuine stereoscopic microscope for three observers (triploscope) in which all three observing light beams are equivalent and have the identical stereoscopic base. It is particularly important that such a design makes it possible to take care as a triploscope of the demands of hand surgery. Such an arrangement can, however, also be used as a microscope for two observers for vitrectomy among others if physical beam splitting is provided for only one light path.

A further useful application provides for the location of the entrance pupils of the observing light paths at the corners of an acute isosceles triangle in which two systems have an equal stereoscopic base while the third system can be used with a reduced stereoscopic base for surgery in large and deep ducts and channels (e.g. disk surgery). If the instrument is used as stereoscopic microscope for two observers the placement of the three observing light paths at the corners of an acute isosceles triangle offers the advantage that two surgeons can sit opposite each other, which is frequently required for surgery of peripheral nerves.

Various embodiments of the invention are shown somewhat schematically in the drawings and described below in more detail.

DESCRIPTION OF THE PREFERRED EMBODIMENTS

Figure 1:
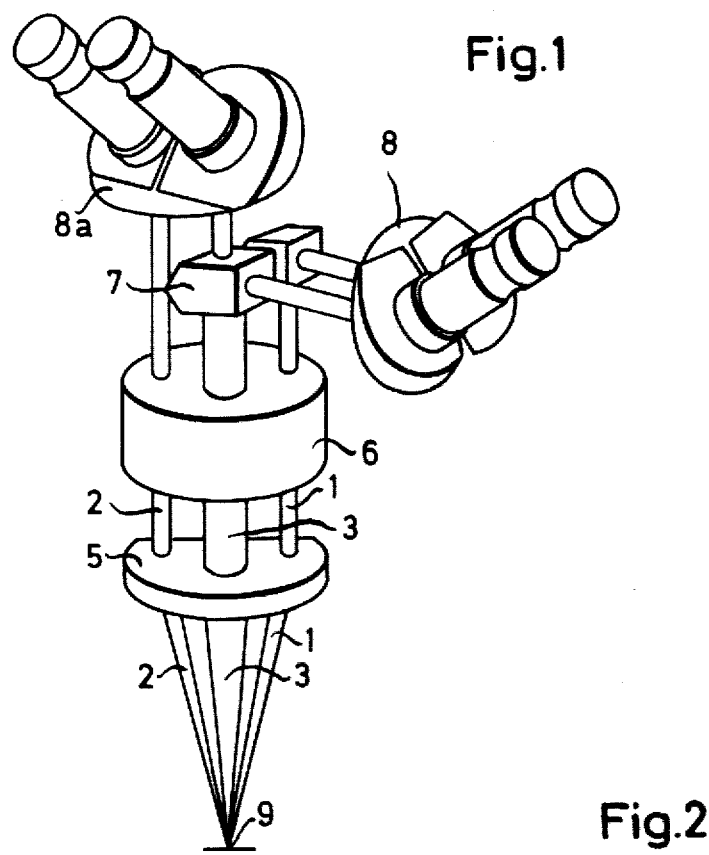
FIG. 1 is a perspective representation of a stereoscopic microscope according to an exemplary embodiment of the invention.

In FIG. 1 the object point to be observed is indicated by 9, the observing light paths 1, 2, and 3, and the magnifying objective common to all three light paths is shown at 5. There is an optical system 6 whose purpose it is to vary the magnification and/or to create a slight divergence or convergence in the approximately parallel beam path for all three light paths (focusing optics). Prism system 7 is used to obtain physical beam splitting in light path 3. Between optical system 6 and prism system 7 the light beam are parallel. There are eyepiece tubes 8 and 8a. By means of double reflection prism system 7, the position of the image remains unchanged when it is observed through tubes 8 or 8a.

The cross section (FIG. 2) at the level of magnifying objective 5 shows the locations of the entrance pupils 1', 2', 3' of the three observing beam paths 1, 2 and 3. Giving the magnifying objective 5 the shape of a circle segment permits placing illuminating optics 4 independently of the observation means. This prevents interference with the observation by the scattering and reflection of light by the objective. In the embodiment shown, entrance pupils 1' and 3' are used for one observer and pupils 2' and 3' for the second observer. If this arrangement of the entrance pupils of the observing light paths is used, the stereoscopic base of the one observer is of the same size as that of the other and forms a right angle with it. Observing light path 3 is common for both observers by means of physical splitting the light coming from object 9 by prism 7. The diameter of light path 3 is approximately 1.4142 times as large as that of the two other light paths 1 and 2, which are equal to each other in size.

Figure 2:
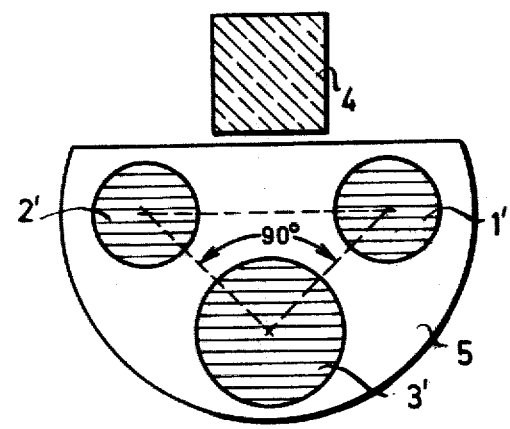
FIG. 2 is a section through the objective of the stereoscopic microscope shown in FIG. 1.

FIG. 2 shows that illumination pupil 4 lies very close to entrance pupils 1', 2', 3' of the observation light paths. It is therefore justifiable to speak here of paraxial illumination. As the illumination requires a minimum of space, particularly if the light enters from the side through fiber optics, there is ample space available in the top part of the microscope which permits the placement of mechanical guides and drive components for the optics of system 6. This permits compact design of the entire microscope.

The microscope according to the invention can also be used as a modular microscope system. If, for example, observation by one observer and simultaneous observation by means of a television system is desired, observation light paths 1 and 2 are used by the observer and path 3 for the television camera. As such devices for additional observers always require greater brightness than the direct observers, it is an advantage in this application that the diameter of light path 3 is larger than the diameter of the two other paths.

Figure 3:
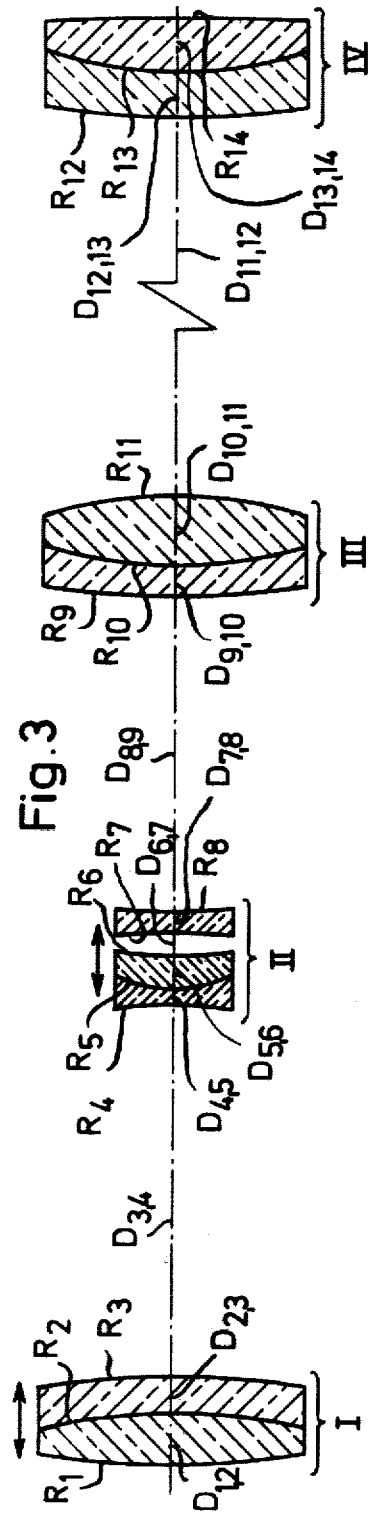
FIG. 3 is a lens diagram illustrating a zoom system for optical path 3 shown in FIG. 1.

If the light paths 1, 2, 3 are arranged in accordance with FIGS. 1 and 2, and a zoom system is arranged in each of the paths, it is necessary to use a zoom system with unusually large aperture as shown in FIG. 3 in light path 3. Different zoom systems are used for the other smaller diameter observation light paths 1 and 2. The zoom system, used in light path 3 when developed for magnifications of 0.5 to 2.5 consists of shiftable lens groups I and II, a stationary lens group III, and tube lens IV which is also stationary. Radii R, refractive indices $n_d$, and Abbe numbers $v_d$ for the lenses, and the axial thickness and air spacings D of the lenses are listed in the table below.

| Groups | Radii | Thickness and spacings | $n_d$ | $v_d$ |
|---|---|---|---|---|
| I | $R_1 = 66.00$ | | | |
| | | $D_{1,2} = 4.8$ | 1.60738 | 56.65 |
| | $R_2 = -38.10$ | | | |
| | | $D_{2,3} = 2.8$ | 1.76180 | 26.95 |
| | $R_3 = -94.00$ | | | |
| | | $D_{3,4} = 31.4$ | | |
| II | $R_4 = -31.00$ | | | |
| | | $D_{4,5} = 1.5$ | 1.60729 | 59.46 |
| | $R_5 = 11.30$ | | | |
| | | $D_{5,6} = 2.8$ | 1.78472 | 25.76 |
| | $R_6 = 23.20$ | | | |
| | | $D_{6,7} = 2.0$ | | |
| | $R_7 = -90.00$ | | | |
| | | $D_{7,8} = 1.5$ | 1.58913 | 61.27 |
| | $R_8 = 90.00$ | | | |
| | | $D_{8,9} = 26.7$ | | |
| III | $R_9 = 130.00$ | | | |
| | | $D_{9,10} = 2.8$ | 1.76180 | 26.95 |
| | $R_{10} = 41.00$ | | | |
| | | $D_{10,11} = 5.2$ | 1.60738 | 56.65 |
| | $R_{11} = -48.50$ | | | |
| | | $D_{11,12} = 80.0$ | | |
| IV | $R_{12} = 76.30$ | | | |
| | | $D_{12,13} = 3.8$ | 1.67270 | 32.21 |
| | $R_{13} = 43.00$ | | | |
| | | $D_{13,14} = 4.5$ | 1.51680 | 64.17 |
| | $R_{14} = -500.00$ | | | |

Figure 4:
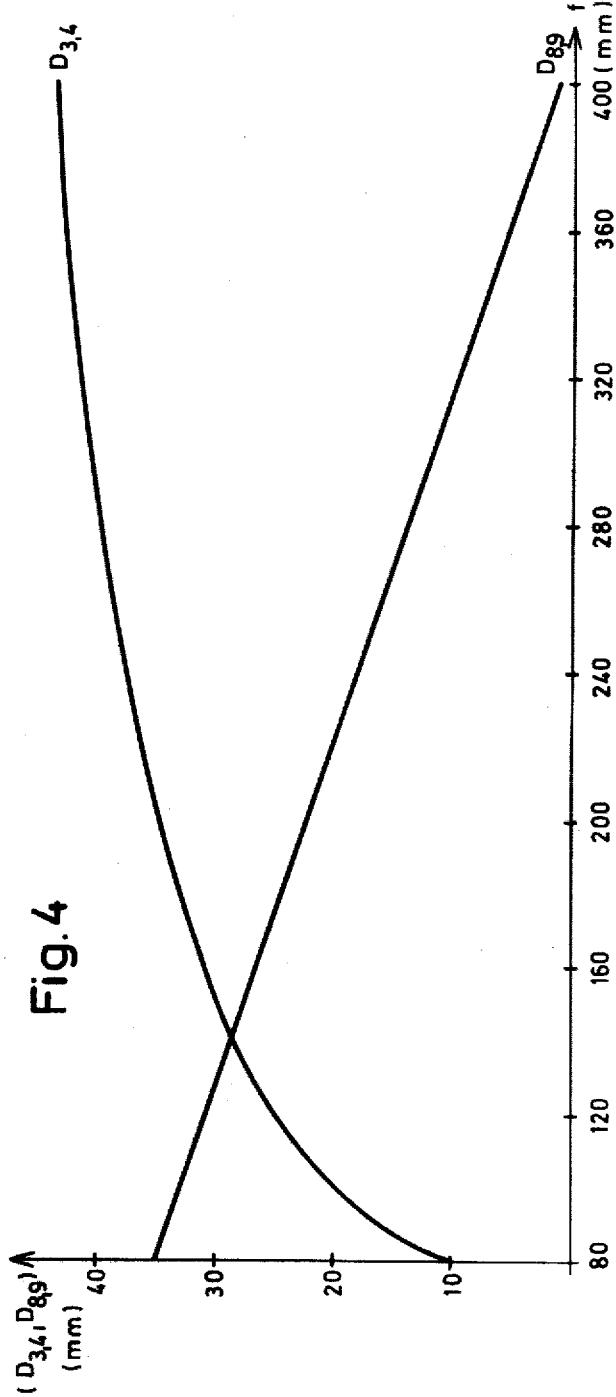
FIG. 4 is a graphic representation of the distances in air between different lens groups of the zoom system according to FIG. 3 as a function of the focal length of the zoom system.

In FIG. 4 the ordinate scale, designated $D_{3,4}$, $D_{8,9}$ represents the spacing along the axis and in the other direction the scale represents the focal length f. Curve $D_{3,4}$ shows the distance in air between groups, I and II, while curve $D_{8,9}$ represents said distance between groups II and III depending on the focal length f of the zoom system. In the embodiment shown the focal length of the tube lens IV is f=160 mm.

Even if the microscope is used by two observers, film and television recordings can be made by means of additional beam splitting.

Figure 5:
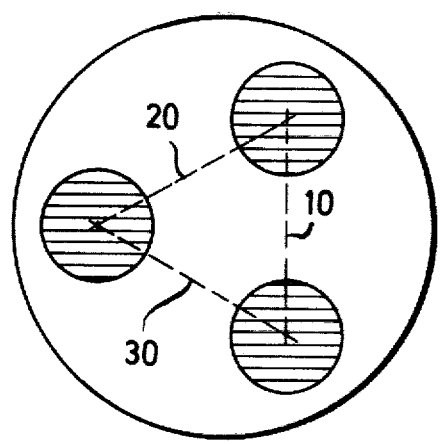
FIG. 5 is a schematic representation of the arrangement of the three observing light paths at the corners of an equilateral triangle.

If the centers of the pupils of the observing light paths are placed as shown in FIG. 5, a genuine triploscope can be obtained if physical beam splitting is applied at each light paths. The reason is that the three systems 10, 20 and 30 are completely equivalent and also have the same stereoscopic base. Such a device can also be used with two observers for vitrectomy. The arrangement according to FIG. 5 is, however, particularly suitable for building an instrument as a triploscope for hand surgery.

Figure 6:
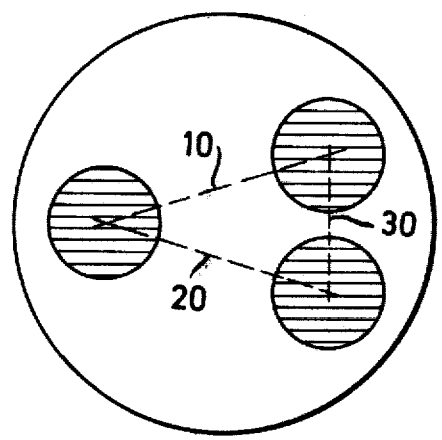
FIG. 6 is a similar schematic representation of the arrangement of the three observing light paths at the corners of an isosceles triangle.

In the arrangement shown in FIG. 6, systems 10 and 20 have a large stereoscopic base, while system 30 with reduced stereoscopic base can be used for surgery, particularly in wide and deep channels (for example in disk surgery). The arrangement shown in FIG. 6 offers the additional advantage that the surgeons can sit opposite each other, which is frequently required for surgery involving peripheral nerves.

What is claimed is:

1. Stereoscopic microscope for multiple observation, comprising three observing light paths, means causing said light paths to converge on an object to be observed, said light paths having entrance pupils with centers lying at the corners of a triangle, and means for splitting at least one of said light paths in such manner as to provide from said three light paths two pairs of stereoscopically related observing light paths so that two observers may simultaneously observe the object stereoscopically.

2. The invention defined in claim 1, wherein the entrance pupil of the optical light path which is common to both observers has a diameter which is larger than the diameter of the entrance pupils of the other two light paths by a factor of approximately the square root of two.

3. The invention defined in claim 2, wherein a zoom lens is provided in each of said three observation light paths.

4. The invention defined in claim 3, wherein the zoom lens system provided in the observation light path common to both observers has substantially the characteristics set forth in the following table, wherein $n_D$ is the refractive index and $v_d$ is the Abbe number for each lens.

| Groups | Radii | Thickness and spacings | $n_d$ | $v_d$ |
|---|---|---|---|---|
| I | $R_1 = 66.00$ | | | |
| | | $D_{1,2} = 4.8$ | 1.60738 | 56.65 |
| | $R_2 = -38.10$ | | | |
| | | $D_{2,3} = 2.8$ | 1.76180 | 26.95 |
| | $R_3 = -94.00$ | | | |
| | | $D_{3,4} = 31.4$ | | |
| | $R_4 = -31.00$ | | | |
| II | | $D_{4,5} = 1.5$ | 1.60729 | 59.46 |
| | $R_5 = 11.30$ | | | |
| | | $D_{5,6} = 2.8$ | 1.78472 | 25.76 |
| | $R_6 = 23.20$ | | | |
| | | $D_{6,7} = 2.0$ | | |
| | $R_7 = -90.00$ | | | |
| | | $D_{7,8} = 1.5$ | 1.58913 | 61.27 |
| | $R_8 = 90.00$ | | | |
| | | $D_{8,9} = 26.7$ | | |
| III | $R_9 = 130.00$ | | | |
| | | $D_{9,10} = 2.8$ | 1.76180 | 26.95 |
| | $R_{10} = 41.00$ | | | |
| | | $D_{10,11} = 5.2$ | 1.60738 | 56.65 |
| | $R_{11} = -48.50$ | | | |
| | | $D_{11,12} = 80.0$ | | |

-continued

| Groups | Radii | Thickness and spacings | $n_d$ | $v_d$ |
|---|---|---|---|---|
| IV | $R_{12} = 76.30$ | | | |
| | | $D_{12,13} = 3.8$ | 1.67270 | 32.21 |
| | $R_{13} = 43.00$ | | | |
| | | $D_{13,14} = 4.5$ | 1.51680 | 64.17 |
| | $R_{14} = -500.00$ | | | |

5. The invention defined in claim 2, wherein the centers of the entrance pupils of the light paths are located at the corners of an isosceles rectangular triangle with the entrance pupil which is common to both observers lying at the right angle of the triangle.

6. The invention defined in claim 2, wherein the centers of the entrance pupils of the light paths are located at the corners of an isosceles triangle.

7. The invention defined in claim 1, wherein the centers of the entrance pupils of the light paths are located at the corners of an equilateral triangle, and there is means for splitting the light in all three light paths.

8. The invention defined in claim 1, further comprising paraxial illumination means having an exit pupil located close to the entrance pupils of the three observing light paths.

* * * * *